(12) United States Patent
Kempf

(10) Patent No.: US 11,642,690 B1
(45) Date of Patent: May 9, 2023

(54) SYSTEMS AND METHODS FOR PAINT APPLICATION DURING PAINT SUBMERSION

(71) Applicant: GM GLOBAL TECHNOLOGY OPERATIONS LLC, Detroit, MI (US)

(72) Inventor: Robert John Kempf, Austin, TX (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 17/453,726

(22) Filed: Nov. 5, 2021

(51) Int. Cl.
  *B05C 3/05* (2006.01)
  *B05C 13/02* (2006.01)
  *B05C 3/10* (2006.01)
  *H02K 7/06* (2006.01)

(52) U.S. Cl.
  CPC ............... *B05C 3/05* (2013.01); *B05C 3/10* (2013.01); *B05C 13/02* (2013.01); *H02K 7/063* (2013.01)

(58) Field of Classification Search
  None
  See application file for complete search history.

(56) References Cited

U.S. PATENT DOCUMENTS

| | | | | |
|---|---|---|---|---|
| 3,839,988 A * | 10/1974 | Duerr | ............ | C25D 13/22 118/663 |
| 4,196,023 A * | 4/1980 | Rowe | ............ | C23C 22/73 118/316 |
| 4,402,765 A * | 9/1983 | Goto | ............ | C23C 22/00 134/76 |
| 4,904,365 A * | 2/1990 | Kawamura | ............ | C25D 13/22 118/500 |
| 5,364,469 A * | 11/1994 | Wakabayashi | ..... | B65G 49/0459 198/465.4 |
| 5,651,822 A * | 7/1997 | Heckmann | ............ | B05C 3/10 118/409 |
| 5,725,669 A * | 3/1998 | Heckmann | ......... | B65G 49/0459 118/409 |
| 6,372,107 B1 * | 4/2002 | Besinger | ............ | B65G 49/0463 204/625 |
| 6,419,983 B1 * | 7/2002 | Kreuzer | ............ | B05C 3/10 427/242 |
| 6,676,755 B2 * | 1/2004 | Ehrenleitner | ......... | C25D 13/22 118/423 |
| 6,689,217 B2 * | 2/2004 | Jarvis | ............ | B05B 13/0452 118/423 |
| 6,706,117 B2 * | 3/2004 | Ehrenleitner | ...... | B65G 49/0459 118/426 |
| 6,991,087 B2 * | 1/2006 | Krannich | ............ | B05C 3/10 198/465.1 |

(Continued)

OTHER PUBLICATIONS

Dayton Electric Mfg. Co. Aug. 2012. Dayton Electric Vibrators Operating Instructions. Retrieved from https://www.zoro.com/static/cms/enhanced_pdf/ZAMnffSdtXZZfgUTg7LNmXfddjg0xBH.PDF.

(Continued)

*Primary Examiner* — Jethro M. Pence
(74) *Attorney, Agent, or Firm* — Lorenz & Kopf LLP

(57) ABSTRACT

A paint application system for an object in a paint submersion operation. The paint application system includes at least one clamp configured to be coupled to the object, and an auxiliary vibration apparatus coupled to the at least one clamp. The auxiliary vibration apparatus is configured to introduce sympathetic vibrations into the object in the paint submersion operation.

11 Claims, 3 Drawing Sheets

(56) References Cited

U.S. PATENT DOCUMENTS

| | | | | |
|---|---|---|---|---|
| 7,026,015 | B2* | 4/2006 | Kreuzer | B05C 3/09 |
| | | | | 118/423 |
| 7,818,921 | B2* | 10/2010 | Hisashi | B05C 3/10 |
| | | | | 198/860.3 |
| 8,187,439 | B2* | 5/2012 | Wang | C23G 1/00 |
| | | | | 204/486 |
| 8,287,709 | B2* | 10/2012 | Hagihara | B65G 49/045 |
| | | | | 204/512 |
| 8,590,481 | B2* | 11/2013 | Nishihara | B65G 49/0481 |
| | | | | 198/346.2 |
| 8,590,482 | B2* | 11/2013 | Nishihara | B05C 3/10 |
| | | | | 427/430.1 |
| 8,844,462 | B2* | 9/2014 | Onozawa | C23C 2/06 |
| | | | | 118/66 |
| 8,893,648 | B2* | 11/2014 | Tsunekawa | C25D 17/00 |
| | | | | 118/620 |
| 8,985,050 | B2* | 3/2015 | Von Gutfeld | B05D 3/06 |
| | | | | 205/205 |
| 8,991,328 | B2* | 3/2015 | Farid | A23P 20/17 |
| | | | | 118/30 |
| 9,004,000 | B2* | 4/2015 | Koga | C23C 2/003 |
| | | | | 118/62 |
| 9,010,516 | B2* | 4/2015 | Nishihara | B65G 17/005 |
| | | | | 198/346.3 |
| 9,021,982 | B2* | 5/2015 | Koga | C23C 2/06 |
| | | | | 118/62 |
| 9,133,540 | B2* | 9/2015 | Jang | C23C 2/00 |
| 9,193,542 | B2* | 11/2015 | Covizzi | B65G 49/049 |
| 9,222,191 | B2* | 12/2015 | Wong | C25D 17/008 |
| 9,228,272 | B2* | 1/2016 | Robbin | C25D 13/00 |
| 9,327,304 | B2* | 5/2016 | Katefidis | B65G 49/0459 |
| 9,346,632 | B2* | 5/2016 | Noda | B65G 49/0477 |
| 9,834,834 | B2* | 12/2017 | Yamauchi | C23C 2/06 |
| 9,962,726 | B2* | 5/2018 | Park | B05C 3/132 |
| 9,968,958 | B2* | 5/2018 | Guastini | B65G 43/00 |
| 10,179,342 | B2* | 1/2019 | Robbin | B05D 1/18 |
| 10,234,398 | B2* | 3/2019 | Kim | G01B 11/24 |
| 10,370,197 | B2* | 8/2019 | Iglio | B65G 49/025 |
| 10,487,414 | B2* | 11/2019 | Noda | C25D 17/02 |
| 10,815,559 | B2* | 10/2020 | Yonekura | C23C 2/40 |
| 11,028,472 | B2* | 6/2021 | Parent | C23C 14/14 |
| 11,045,832 | B1* | 6/2021 | Hubbard | B05D 7/06 |
| 11,072,845 | B2* | 7/2021 | Kurisu | C23C 2/40 |
| 11,084,669 | B2* | 8/2021 | Iglio | B65G 49/0463 |
| 11,124,863 | B2* | 9/2021 | Kayama | C23C 2/40 |
| 11,203,036 | B1* | 12/2021 | Lin | B05C 13/02 |
| 11,242,590 | B2* | 2/2022 | Mason | C23C 2/06 |
| 11,493,724 | B2* | 11/2022 | Dorner | B05C 13/025 |
| 2002/0162504 | A1* | 11/2002 | Kreuzer | B05C 3/10 |
| | | | | 118/423 |
| 2006/0037534 | A1* | 2/2006 | Weinand | B65G 49/0459 |
| | | | | 118/426 |
| 2014/0021054 | A1* | 1/2014 | Robbin | C25D 13/00 |
| | | | | 204/622 |
| 2014/0314963 | A1* | 10/2014 | Covizzi | B05C 3/10 |
| | | | | 427/430.1 |
| 2014/0374214 | A1* | 12/2014 | Nishihara | B65G 17/005 |
| | | | | 198/339.1 |
| 2015/0013598 | A1* | 1/2015 | Robbin | B05C 3/10 |
| | | | | 118/416 |
| 2015/0068453 | A1* | 3/2015 | Katefidis | B65G 49/0459 |
| | | | | 118/426 |
| 2015/0345050 | A1* | 12/2015 | Wilson | B29C 70/20 |
| | | | | 118/100 |
| 2016/0348261 | A1* | 12/2016 | Klauke | C23C 2/40 |
| 2022/0152647 | A1* | 5/2022 | Green | B05B 5/082 |

OTHER PUBLICATIONS

Precision Microdrives. May 2021. Experiments in Waterproofing/Overmolding Vibration Motors. AB-16. https://www.precisionmicrodrives.com/ab-016.

MSC. 2020-2021. Carbon Steel Pull Action Latch Clamp. https://www.mscdirect.com/product/details/82405754?rItem=82405754.

* cited by examiner

SYSTEMS AND METHODS FOR PAINT APPLICATION DURING PAINT SUBMERSION

INTRODUCTION

The technical field generally relates to systems and methods for paint application during a paint submersion operation, and more particularly relates to systems and methods for increasing paint flow and the application of paint in a vehicle paint submersion operation.

In certain manufacturing operations, an object may be submerged and passed through a paint bath to apply paint over exposed surfaces of the item. For example, during automotive manufacturing, a vehicle may be submerged and passed through a paint bath, which applies paint to the exposed surfaces of the vehicle. In certain instances, due to the shape or structure of the vehicle, for example, the paint may not be evenly applied over the exposed surfaces of the vehicle during the paint submersion operation.

Accordingly, it is desirable to provide improved systems and methods for the application of paint to an object, such as a vehicle, during a paint submersion operation. Furthermore, other desirable features and characteristics of the present invention will become apparent from the subsequent detailed description and the appended claims, taken in conjunction with the accompanying drawings and the foregoing technical field and background.

SUMMARY

According to various embodiments, provided is a paint application system for an object in a paint submersion operation. The paint application system includes at least one clamp configured to be coupled to the object, and an auxiliary vibration apparatus coupled to the at least one clamp. The auxiliary vibration apparatus is configured to introduce sympathetic vibrations into the object in the paint submersion operation.

The auxiliary vibration apparatus is an electric vibration motor. The paint application system includes a controller in communication with the electric vibration motor, and the controller is configured to control the electric vibration motor at a constant frequency. The paint application system includes a controller in communication with the electric vibration motor, and the controller is configured to control the electric vibration motor at a modulated frequency. The modulated frequency varies between a rated frequency of the electric vibration motor and up to 10% less of the rated frequency of the electric vibration motor. The paint application system includes a bracket coupled to the at least one clamp and to the auxiliary vibration apparatus to couple the auxiliary vibration apparatus to the at least one clamp. The object is a vehicle, and the at least one clamp is configured to be coupled to a body-in-white of the vehicle to introduce the sympathetic vibrations into the body-in-white. The at least one clamp is a horizontal J-hook toggle latch clamp.

Further provided is a method for paint application for an object in a paint submersion operation. The method includes coupling an auxiliary vibration apparatus to the object, and energizing the auxiliary vibration apparatus to introduce sympathetic vibrations into the object in the paint submersion operation.

The auxiliary vibration apparatus is an electric vibration motor. The energizing the auxiliary vibration apparatus includes controlling, by a processor, the electric vibration motor at a constant frequency. The energizing the auxiliary vibration apparatus includes controlling, by a processor, the electric vibration motor at a modulated frequency. The controlling, by the processor, the electric vibration motor at the modulated frequency includes varying a frequency between a rated frequency of the electric vibration motor and up to 10% less of the rated frequency of the electric vibration motor. The coupling of the auxiliary vibration apparatus to the object includes coupling the auxiliary vibration apparatus to the object with at least one clamp. The object is a vehicle and the coupling the auxiliary vibration apparatus to the object includes coupling the auxiliary vibration apparatus to a body-in-white of the vehicle or a carrier that supports the body-in-white during the paint submersion operation to introduce the sympathetic vibrations into the body-in-white or the carrier.

Also provided is a paint submersion system. The paint submersion system includes a bath having an entry, an exit opposite the entry, and a passage defined between the entry and the exit configured to be filled with a paint at a depth to submerge a vehicle. The paint submersion system includes a conveyor system configured to transport the vehicle through the bath from the entry to the exit, and the conveyor system includes a carrier configured to receive the vehicle. The paint submersion system includes a paint application system to be coupled to the vehicle or the carrier proximate the entry of the bath. The paint application system includes at least one clamp configured to couple the paint application system to the vehicle or the carrier, and an auxiliary vibration apparatus coupled to the at least one clamp. The auxiliary vibration apparatus is configured to introduce sympathetic vibrations into the vehicle as the vehicle is transported through the bath.

The auxiliary vibration apparatus is an electric vibration motor. The paint submersion system includes a controller in communication with the electric vibration motor, and the controller is configured to control the electric vibration motor at a constant frequency. The paint submersion system includes a controller in communication with the electric vibration motor, and the controller is configured to control the electric vibration motor at a modulated frequency that varies between a rated frequency of the electric vibration motor and up to 10% less of the rated frequency of the electric vibration motor. The paint submersion system includes a bracket coupled to the at least one clamp and to the auxiliary vibration apparatus to couple the auxiliary vibration apparatus to the at least one clamp.

BRIEF DESCRIPTION OF THE DRAWINGS

The exemplary embodiments will hereinafter be described in conjunction with the following drawing figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding introduction, brief summary or the following detailed description. Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the system described herein is merely an exemplary embodiment of the present disclosure.

For the sake of brevity, conventional techniques related to signal processing, data transmission, signaling, control, machine learning models, radar, lidar, image analysis, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

Figure 1:
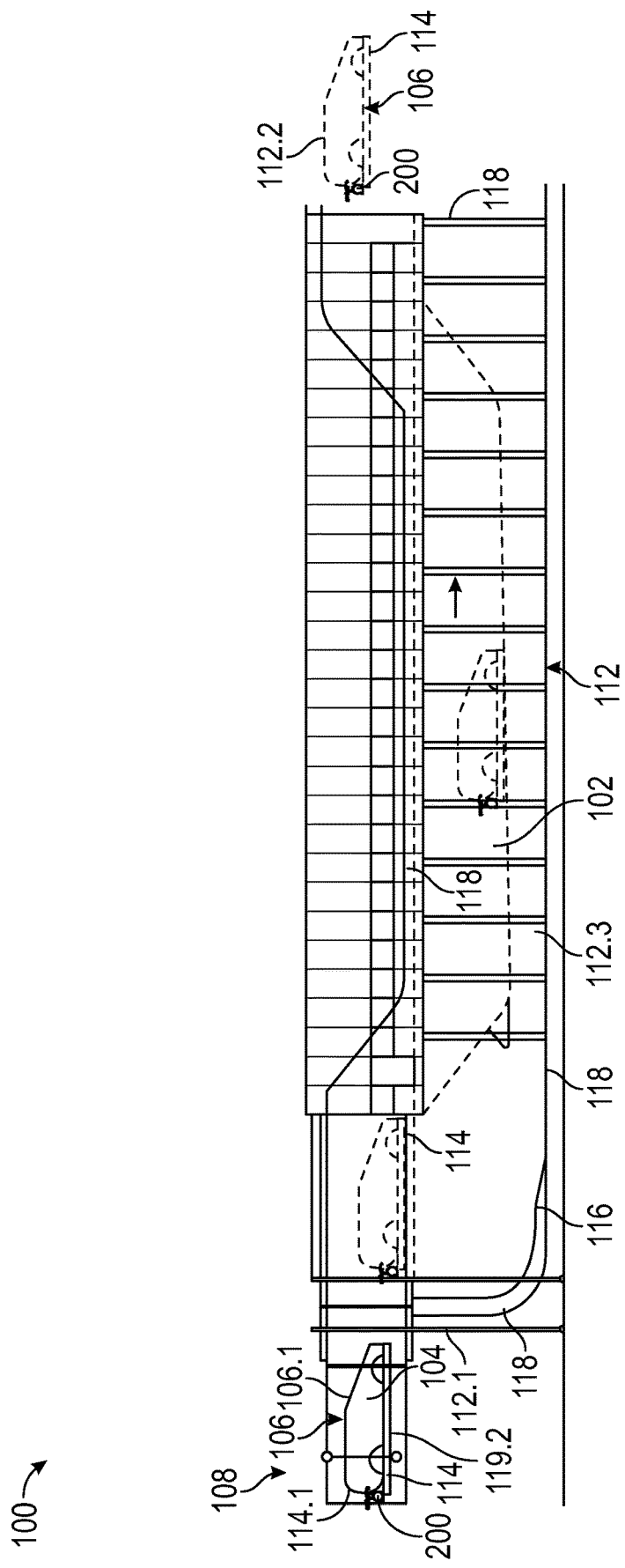
FIG. 1 is a schematic illustration of an exemplary paint submersion operation for an object, such as a vehicle, which includes a system for paint application, in accordance with various embodiments.

With reference to FIG. 1, an exemplary paint submersion system or paint submersion operation is shown at 100. In this example, the paint submersion operation 100 will be discussed as applying paint 102 to an exposed surface 104 of a body-in-white 106 of a vehicle 108 by passing the body-in-white 106 through a paint bath 112, however, it should be understood that the paint submersion operation 100 and the techniques for paint application discussed herein are applicable to other paint submersion operations for other objects. In this example, the paint 102 contained in the paint bath 112 is a non-Newtonian thixotropic fluid. The body-in-white 106 generally comprises structural elements of the vehicle 108, which are joined together. The body-in-white 106 may have a number of surfaces exposed to the paint 102 in the paint bath 112, which may be generally referred to herein as the exposed surface 104 of the body-in-white 106. The exposed surface 104 of the body-in-white 106 comprises the surface of the vehicle 108, and the paint submersion operation 100 includes a system for paint application or paint application system 200 to ensure that the paint 102 is substantially evenly applied to the surface of the vehicle 108 as will be discussed herein.

In the example of FIG. 1, the paint submersion operation 100 includes a conveyor system 110 and the paint bath 112. The conveyor system 110 guides the body-in-white 106 through the paint bath 112 to apply the paint 102 to the exposed surface 104. Generally, the conveyor system 110 is any system suitable for carrying the body-in-white 106 through the paint bath 112, and in one example, may include a carrier 114 and a track 116. The carrier 114 is sized and shaped to receive and support the body-in-white 106 thereon, and may include a carrier arm 114.1 for supporting a portion of the paint application system 200, as will be discussed herein. The carrier 114 also includes a floor panel 114.2 or other planar surface upon which the body-in-white 106 is coupled and secured for travel through the paint bath 112. The carrier 114 is supported on the track 116, and one or more actuators (not shown) may be used to propel the carrier 114 along the track 116. The track 116 is defined through the paint bath 112. The paint bath 112 may include any suitable containment structure for containing the paint 102 while permitting the carrier 114 with the body-in-white 106 to traverse through the paint bath 112. For example, the paint bath 112 may include a plurality of walls 118 that cooperate to form a tank to enclose the paint bath 112 while defining an inlet or entry 112.1 at a first end and an outlet or exit 112.2 at a second end. The entry 112.1 and the exit 112.2 are vertically displaced above a main paint passage 112.3 of the paint bath 112, which contains the paint 102. Generally, the main paint passage 112.3 of the paint bath 112 is defined with a depth of paint 102 that enables a full submersion of the body-in-white 106 in the paint 102 to ensure that a roof 106.1 of the body-in-white 106 is covered by the paint 102. The carrier 114 of the conveyor system 110 transports the body-in-white 106 from the entry 112.1 of the paint bath 112, down through the main paint passage 112.3 and the paint 102 contained in the paint bath 112 and up to the exit 112.2 to apply paint to the exposed surface 104 of the vehicle 108. Generally, the track 116 extends from the entry 112.1 through the main paint passage 112.3 to the exit 112.2, and in this example, from the entry 112.1 to the main paint massage 112.3, the track 116 extends down at about a 33 degree angle to direct the carrier 114 down into the main paint passage 112.3 for submersion of the body-in-white 106. The track 116 extends substantially horizontally along the main paint passage 112.3. From the main paint passage 112.3 to the exit 112.2, the track 116 extends upward at about a 33 degree angle to direct the carrier 114 up to the exit 112.2. The changes in the elevation of the track 116, and the carrier 114 on the track 116, may cause air bubbles to become trapped along the exposed surface 104 of the body-in-white 106. In addition, the exiting of the carrier 114, and the body-in-white 106, from the main paint passage 112.3 may result in pooling of the paint 102 on the exposed surface 104 of the body-in-white 106. As will be discussed, the paint application system 200 reduces the likelihood of the air bubbles becoming trapped along the exposed surface 104 of the body-in-white 106 and also reduces or inhibits pooling of the paint 102, which improves application of the paint 102 to the exposed surface 104 of the body-in-white 106.

The paint application system 200 ensures a substantially even application of the paint 102 to the exposed surface 104 by causing sheer forces in the paint 102 adjacent to and at the exposed surface 104. In one example, the paint application system 200 includes a clamp 202, a bracket 204, an auxiliary vibration apparatus 206 and a controller 208. As will be discussed, since the paint 102 is a non-Newtonian thixotropic fluid, the sheer forces in the paint 102 adjacent to and at the exposed surface 104 caused by the paint application system 200 result in the paint 102 becoming less viscous in direct relation to the fluid sheer rate. The reduced viscosity or thinning of the paint 102 adjacent to and at the exposed surface 104 enables air bubbles trapped during the submersion of the body-in-white 106 to escape and encourages pooled paint on the exposed surface 104 to flow, resulting in substantially even application of paint 102 to the exposed surface 104.

Figure 2:
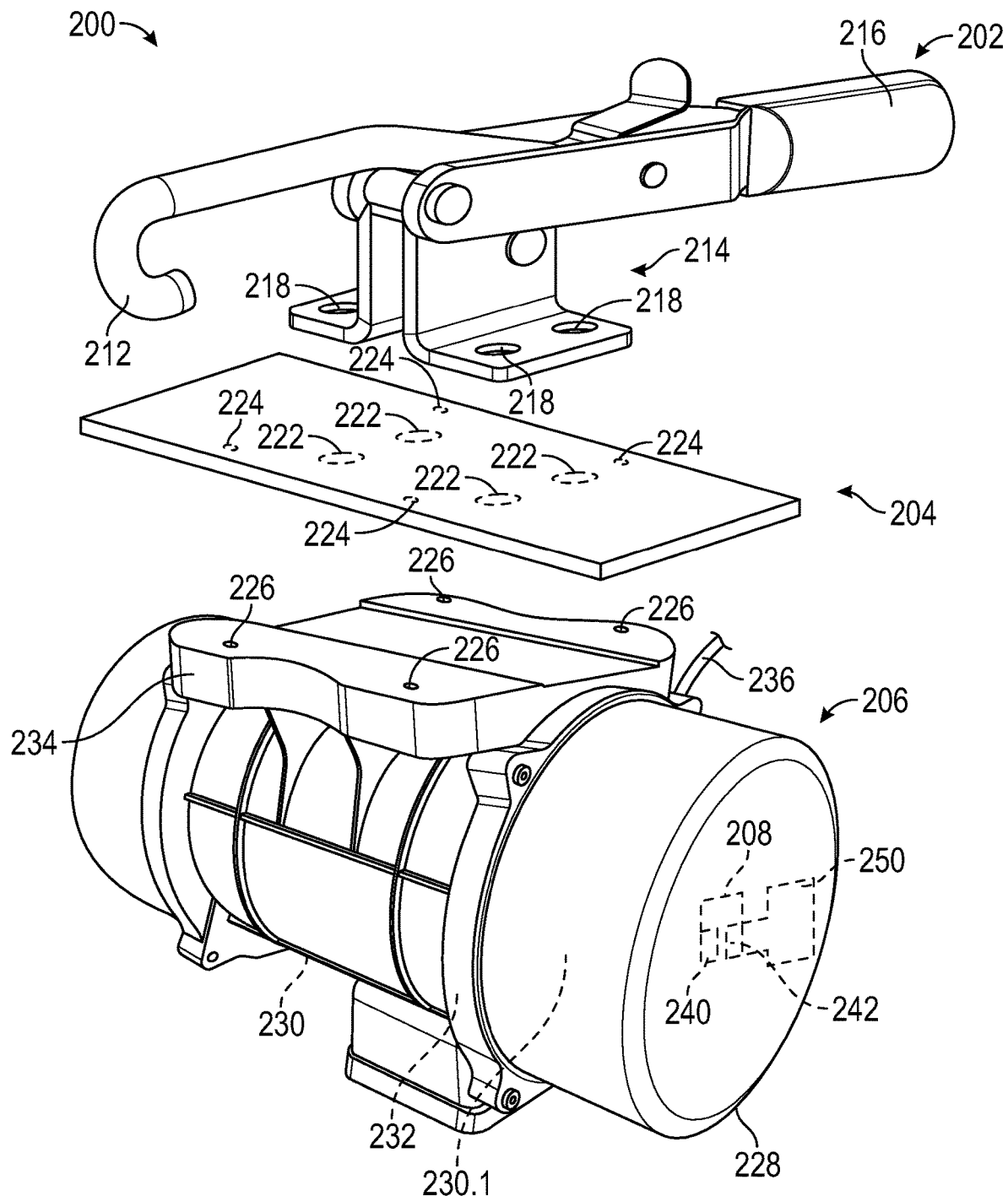
FIG. 2 is an exploded view of the system for paint application of FIG. 1.

With reference to FIG. 2, the paint application system 200 is shown in greater detail in an exploded view. The clamp 202 quickly and easily removably couples the paint application system 200 to the body-in-white 106 or to the carrier 114 (FIG. 1) to traverse with the body-in-white 106 or the carrier 114 through the paint bath 112 from the entry 112.1 to the exit 112.2 (FIG. 1). It should be noted that while a single clamp 202 is shown and described herein, the paint application system 200 may include any number of clamps 202 or mechanisms to removably couple the paint application system 200 to the body-in-white 106 or to the carrier 114 (FIG. 1). In this example, the clamp 202 is a horizontal J-hook pull action or toggle latch clamp. Generally, the clamp 202 comprises any clamp that is capable of being coupled to the body-in-white 106 or to the carrier 114 (FIG. 1) and also to the auxiliary vibration apparatus 206. In this example, the clamp 202 includes a hook 212 and mounting bracket 214. The hook 212 and the mounting bracket 214 are each composed of a metal or metal alloy, and may be stamped, cast, machined, etc. The hook 212 is coupled to the mounting bracket 214 via a toggle lever 216. The hook 212 may be coupled to the toggle lever 216 via one or more mechanical fasteners, such as nuts that engage a threaded shaft of the hook 212. The toggle lever 216 is coupled to the mounting bracket 214 via a mechanical fastener, such as a bolt. The toggle lever 216 is movable relative to the mounting bracket 214 for coupling the clamp 202 to the body-in-white 106 or to the carrier 114 (FIG. 1). Generally, a movement of the toggle lever 216 toward the mounting bracket 214 to a horizontal position relative to the mounting bracket 214 retracts the hook 212 and applies a clamping force between the hook 212 and the mounting bracket 214 to couple the paint application system 200 to the body-in-white 106 or to the carrier 114 (FIG. 1). A movement of the toggle lever 216 in an opposite direction, away from the mounting bracket 214 to a vertical position relative to the mounting bracket 214, releases the hook 212 and the clamp force to enable removal of the clamp 202 and the paint application system 200 from body-in-white 106 or the carrier 114 (FIG. 1).

Generally, the hook 212 enables the paint application system 200 to be coupled to a portion of the body-in-white 106, such as to a floorboard of the body-in-white 106. It should be noted that the hook 212 may also be used to couple the paint application system 200 to the trunk, roof, beam, pillar, panel, or other portion of the body-in-white 106. The hook 212 may also be used to couple the paint application system 200 to the carrier 114 (FIG. 1), by engaging with a surface of the carrier 114 or with the carrier arm 114.1, for example. The mounting bracket 214 defines a plurality of fastening bores 218, which receive a respective mechanical fastener, such as a bolt, to couple the clamp 202 to the bracket 204.

The bracket 204 couples the clamp 202 to the auxiliary vibration apparatus 206. It should be noted that the bracket 204 may be optional, as the clamp 202 may be coupled directly to the auxiliary vibration apparatus 206. In one example, the bracket 204 is composed of a metal or metal alloy, and is cast, stamped, forged, machined, additively manufactured, etc. The bracket 204 transfers vibrations from the auxiliary vibration apparatus 206 into the clamp 202, which in turn, transfers the vibrations to the body-in-white 106 or to the carrier 114 that transmits them to the body-in-white 106 (FIG. 1). The bracket 204 is illustrated as planar and rectangular, however, the bracket 204 may have any predetermined shape. The bracket 204 includes a plurality of clamp bores 220 and a plurality of apparatus bores 222. The clamp bores 220 are coaxially aligned with the fastening bores 218 when the clamp 202 is coupled to the bracket 204. In one example, the clamp bores 220 are threaded, and receive the mechanical fastener to couple the clamp 202 to the bracket 204. It should be noted that the clamp bores 220 may be unthreaded, and washers and lock nuts may be employed with the bolts to couple the clamp 202 to the bracket 204. The apparatus bores 222 are coaxially aligned with bores 224 of the auxiliary vibration apparatus 206 when the auxiliary vibration apparatus 206 is coupled to the bracket 204. The apparatus bores 222 are threaded, and receive a mechanical fastener, such as a bolt, to couple the auxiliary vibration apparatus 206 to the bracket 204. It should be noted that the apparatus bores 222 may be unthreaded, and washers and lock nuts may be employed with the bolts to couple the auxiliary vibration apparatus 206 to the bracket 204.

In this example, the clamp bores 220 are defined on a first surface 204.1 of the bracket 204, which is opposite a second surface 204.2. The apparatus bores 222 are defined on the second surface 204.2, and are offset from and misaligned with the clamp bores 220. Thus, in this example, the bracket 204 is an adapter bracket for coupling the clamp 202 to the auxiliary vibration apparatus 206 as in this example, the fastening bores 218 of the mounting bracket 214 are offset and misaligned with the bores 226 of the auxiliary vibration apparatus 206. It should be noted that in other examples, the fastening bores 218 and the bores 226 of the auxiliary vibration apparatus 206 may be coaxially aligned, and the clamp bores 220 and the apparatus bores 222 may also be coaxially aligned. It should be noted that while the bracket 204 is described and illustrated herein as being used with a single clamp 202, if the bracket 204 is employed, the bracket 204 may be configured to be used with multiple clamps 202, if desired.

The auxiliary vibration apparatus 206 introduces sympathetic vibrations to the body-in-white 106 or the carrier 114 that transmits the vibrations to the body-in-white 106 (FIG. 1) to cause sheer stress adjacent to or at the exposed surface 104 of the body-in-white 106 (FIG. 1). Sympathetic vibrations are vibrations introduced into the body-in-white 106 or the carrier 114 of generally the same period as the vibrations output by the auxiliary vibration apparatus 206. The vibration of the carrier 114 caused by the sympathetic vibrations introduced by the auxiliary vibration apparatus 206 into the carrier 114 causes sympathetic vibrations in the body-in-white 106 on the carrier 114. Thus, generally, the auxiliary vibration apparatus 206 introduces sympathetic vibrations into the vehicle 108 in the paint submersion operation 100 and the resulting sheer stress delivers a desirable even application of paint 102 to the exposed surface 104. In one example, the auxiliary vibration apparatus 206 is an ingress protection certified electric vibration motor. Generally, the auxiliary vibration apparatus 206 has an ingress protection certification rating of IP65 to IP67, however, the paint 102 is unlikely to ingress into the auxiliary vibration apparatus 206 as the body-in-white 106 and the carrier 114 (FIG. 1) traverses through the paint bath 112. In one example, the auxiliary vibration apparatus 206 includes, but is not limited to, a 5.3 lb Dayton Electric Vibrator Motor, Model No. 23Y181, commercially available from W.W. Grainger Inc. of Lake Forest, Ill.. In this example, the auxiliary vibration apparatus 206 is an alternating current (AC) vibration motor, however, a direct current (DC) vibration motor may be used if desired. It should be noted, however, that any vibration apparatus or vibration motor may be employed to introduce sympathetic vibrations into the body-in-white 106 or the carrier 114 (FIG. 1), and the vibration motor discussed herein is merely an example. In one example, the auxiliary vibration apparatus 206 is overmolded with a waterproofing material to increase the ingress protection certification rating. For example, the auxiliary vibration apparatus 206 is overmolded with the waterproofing to increase the ingress protection certification to IP67. Suitable waterproofing materials include may include an epoxy. In addition, while the paint application system 200 is described and illustrated herein as comprising a single one of the auxiliary vibration apparatus 206, the paint application system 200 may include multiple auxiliary vibration apparatuses 206 if desired.

In this example, the auxiliary vibration apparatus 206 includes a housing 228, an electric motor 230 and an eccentric mass 232. The housing 228 encloses the electric motor 230 and the eccentric mass 232, and provides ingress protection. The housing 228 includes a flange 234, and the bores 226 are defined in the flange 234. The bores 226 receive the mechanical fastener, such as the bolt, to couple the auxiliary vibration apparatus 206 to the bracket 204. The electric motor 230 is an alternating current (AC) motor responsive to alternating current (AC) received from a power source 231 (FIG. 1) to drive a rotor 230.1. The eccentric mass 232 is coupled to the rotor 230.1, and rotates with the rotor 230.1. Since the mass 232 is eccentric or unbalanced, the rotation of the eccentric mass 232 generates a vibration, which passes through the housing 228 and induces sympathetic vibrations in the body-in-white 106 (FIG. 1). In this example, the electric motor 230 is coupled to the power source 231 via a power cable 236 that extends outwardly from the housing 228. The power cable 236 is positioned over or about the arm 114.1 of the carrier 114 to move with the carrier 114 and the body-in-white 106 through the paint bath 112 (FIG. 1). The power cable 236 is coupled to the power source 231, which includes, but not limited to, power supplied by an outlet adjacent to the paint bath 112 to provide power to the auxiliary vibration apparatus 206. In other embodiments, the auxiliary vibration apparatus 206 may include a battery pack or an on-board power supply such that the power cable 236 is not needed.

The controller 208 is in communication with the auxiliary vibration apparatus 206 via a suitable communication medium that enables the transfer of data and power from the power cable 236 to the electric motor 230. In one example, the controller 208 is disposed within the housing 228 so as to be protected from ingress of the paint 102. It should be noted that in other examples, the controller 208 may be disposed on the bracket 204 or at another location to be in communication with the electric motor 230. The controller 208 includes at least one processor 240 and a computer readable storage device or media 242. The processor 240 can be any custom made or commercially available processor, a central processing unit (CPU), a graphics processing unit (GPU), an auxiliary processor among several processors associated with the controller 208, a semiconductor based microprocessor (in the form of a microchip or chip set), a macroprocessor, any combination thereof, or generally any device for executing instructions. The computer readable storage device or media 242 may include volatile and nonvolatile storage in read-only memory (ROM), random-access memory (RAM), and keep-alive memory (KAM), for example. KAM is a persistent or non-volatile memory that may be used to store various operating variables while the processor 240 is powered down. The computer-readable storage device or media 242 may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 208 in controlling the electric motor 230 of the auxiliary vibration apparatus 206.

The instructions may include one or more separate programs, each of which comprises an ordered listing of executable instructions for implementing logical functions. The instructions, when executed by the processor 240, perform logic, calculations, methods and/or algorithms for controlling a frequency of the auxiliary vibration apparatus 206, and generate control signals to control the frequency of the electric motor 230 of the auxiliary vibration apparatus 206, and thus, the frequency of the vibrations, based on the logic, calculations, methods, and/or algorithms. Although only one controller 208 is shown in FIG. 2, embodiments of the paint application system 200 can include any number of controllers 208 that communicate over any suitable communication medium or a combination of communication mediums and that cooperate to generate control signals to control the auxiliary vibration apparatus 206.

In various embodiments, the controller 208 is a programmable logic controller (PLC), which is programmed to supply the power from the power cable 236 to the electric motor 230 at a continuous frequency. In this example, the auxiliary vibration apparatus 206 vibrates at a frequency of about 3600 Hertz (Hz), however, depending upon a natural resonant frequency of the body-in-white 106, the auxiliary vibration apparatus 206 may be predetermined to vibrate at a different frequency. The continuous vibrations output by the auxiliary vibration apparatus 206 are transferred via the clamp 202 to the body-in-white 106 or to the carrier 114 to the body-in-white 106 (FIG. 1) and cause the body-in-white 106 to vibrate as the body-in-white 106 traverses through the paint bath 112 on the conveyor system 110.

In other embodiments, the controller 208 is programmed to control a variable frequency drive 250 that provides power to the electric motor 230 at a modulated frequency. In one example, the controller 208 is programmed to control the variable frequency drive 250 to vary or modulate the frequency of the vibrational output by the auxiliary vibration apparatus 206 by about negative 5% (or 5% less) up to about negative 10% (or 10% less) of the rated frequency of the auxiliary vibration apparatus 206. In the example of the auxiliary vibration apparatus 206 having a rated frequency of about 3600 Hertz (Hz), the controller 208 outputs one or more control signals to the variable frequency drive 250 to modulate the frequency of the auxiliary vibration apparatus 206, and thus, the frequency of the vibrations in a sinusoidal pattern between about 3600 Hertz (Hz) and about 3420 Hertz (Hz) (in the example of 10% less than the rated frequency) over a period of about two seconds. By modulating the frequency of the auxiliary vibration apparatus 206, the controller 208 ensures that the body-in-white 106 is not vibrated at a multiple of its resonant frequency and may inhibit a standing wave vibration of the body-in-white 106.

Generally, the vibration of the body-in-white 106 by either a constant or modulated frequency creates sheer forces in the paint 102 adjacent to and at the exposed surface 104 (FIG. 1). Sheer forces in the paint bath 112 caused by the vibration of the body-in-white 106 taper off in relation to the distance from the exposed surface 104 of the body-in-white 106. Since the paint 102 is a non-Newtonian thixotropic fluid, the sheer forces result in a viscosity gradient in the paint bath 112 orthogonal to the exposed surface 104, with the least viscous (easiest to flow) paint 102 closest to and at the exposed surface 104 of the body-in-white 106. The lower viscosity of the paint 102 at the exposed surface 104 results in a thinning of the paint 102 along the exposed surface 104, which provides the improved paint flow. With improved paint flow along and touching the exposed surface 104, the paint 102 more easily penetrates small gaps on and between the exposed surface 104. In addition, the lower viscosity of the paint 102 at the exposed surface 104 makes it more likely air bubbles trapped under the paint 102 will escape from the exposed surface 104 of the body-in-white 106 (FIG. 1). In addition, the vibration of the body-in-white 106 assists in breaking large air bubbles into smaller air bubbles, which also increases the likelihood of the air bubbles escaping from the exposed surface 104 through the thinner paint 102. The vibration of the body-in-white 106 also enables pooled paint on the body-in-white 106 to flow for more even coverage of the paint 102 on the exposed surface 104 of the body-in-white 106 by breaking the surface tension of the paint 102 when exposed to air upon emerging from the main paint passage 112.3 of the paint bath 112. The sympathetic vibration of the body-in-white 106 also assists in draining the paint 102 from the body-in-white 106 once emerged from the main paint passage 112.3.

In one example, in order to assemble the paint application system 200, the clamp 202 is coupled to the bracket 204 by inserting mechanical fasteners through the fastening bores 218 of the mounting bracket 214 and the clamp bores 220 of the bracket 204. The auxiliary vibration apparatus 206 is coupled to the bracket 204 by inserting mechanical fasteners, such as bolts, through the bores 226 of the auxiliary vibration apparatus 206 and the apparatus bores 222 of the bracket 204.

Figure 3:
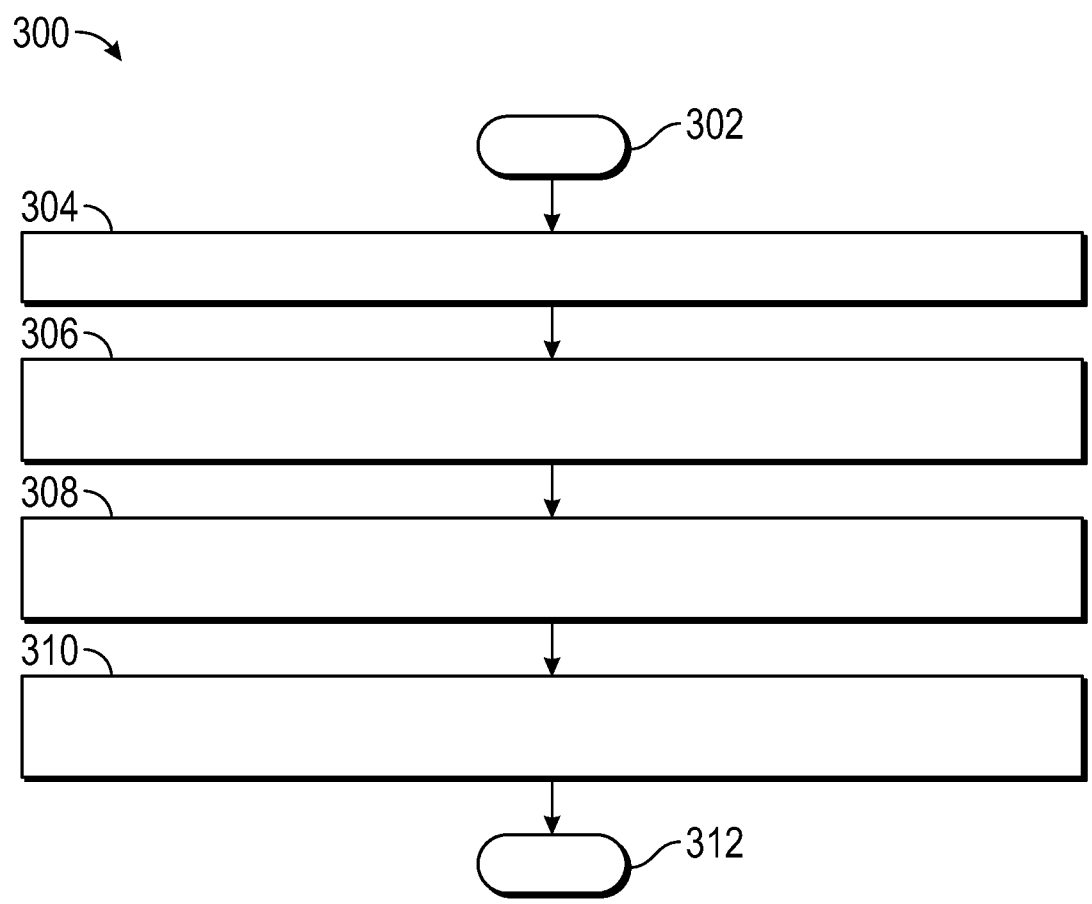
FIG. 3 is a flowchart illustrating a paint application method that can be performed with the system for paint application in accordance with various embodiments.

With the paint application system 200 assembled, referring now to FIG. 3, and with continued reference to FIGS. 1 and 2, a flowchart illustrates a paint application method 300 in accordance with the present disclosure. In one example, the body-in-white 106 is coupled to or positioned on the carrier 114, and the method begins at 302. At 304, the auxiliary vibration apparatus 206 is coupled to the power source 231. In the example of the electric motor 230 including the power cable 236, the power cable 236 is positioned over the arm 114.1 of the carrier 114. The controller 208 supplies the alternating current from the power source 231 to the electric motor 230 to energize the electric motor 230 to drive the rotor 230.1, and thus, the eccentric mass 232 to generate vibrations at the rated frequency. In the example of the controller 208 controlling the electric motor 230 at a continuous frequency, the auxiliary vibration apparatus 206 outputs vibrations at the rated frequency. In the example of the controller 208 controlling the variable frequency drive 250, the variable frequency drive 250 modulates the frequency supplied to the electric motor 230 such that the vibrations output by the auxiliary vibration apparatus 206 vary between the rated frequency and up to about 10 percent less than the rated frequency in a sinusoidal pattern over the predetermined period, which in one example, is about two seconds.

At 306, with the auxiliary vibration apparatus 206 generating vibrations at the continuous or modulated frequency, the auxiliary vibration apparatus 206 is coupled to the body-in-white 106 or to the carrier 114 at the entry 112.1 of the paint bath 112. In one example, with the toggle lever 216 raised substantially vertically to the mounting bracket 214, the hook 212 of the clamp 202 is positioned about a portion of the body-in-white 106, such as the floorboard, beam, pillar, or the like, and the toggle lever 216 is moved to extend substantially horizontal to the mounting bracket 214 to clamp the auxiliary vibration apparatus 206 to the body-in-white 106. It should be noted that the location for coupling the clamp 202 to the body-in-white 106 may vary for different models or types of vehicles 108. In the example of coupling the auxiliary vibration apparatus 206 to the carrier 114, the hook 212 of the clamp 202 is positioned about a portion of the carrier 114, such as the floor panel 114.2, and the toggle lever 216 is moved to extend substantially horizontal to the mounting bracket 214 to clamp the auxiliary vibration apparatus 206 to the carrier 114.

With the auxiliary vibration apparatus 206 coupled to the body-in-white 106 or the carrier 114, the vibrations output by the auxiliary vibration apparatus 206 result in sympathetic vibrations or vibrations in the body-in-white 106. At 308, with the auxiliary vibration apparatus 206 generating vibrations at the continuous or modulated frequency, the carrier 114 is conveyed or traverses the paint bath 112 along the conveyor system 110 from the entry 112.1, through the main paint passage 112.3, to the exit 112.2 of the paint bath 112. The continual or modulated vibrations output by the auxiliary vibration apparatus 206 result in reduced viscosity of the paint 102 proximate and at the exposed surface 104 of the body-in-white 106, which reduces paint bubbles and pooling on the body-in-white 106 during submersion and travel of the body-in-white 106 through the paint bath 112 from the entry 112.1 to the exit 112.2 and thereby improves an application of the paint 102 to the body-in-white 106. In addition, by improving the application of the paint 102 to the body-in-white 106, a noise, vibration, and harshness of the vehicle 108 may be reduced along with a susceptibility to corrosion.

At 310, at the exit 112.2 of the paint bath 112, in one example, the auxiliary vibration apparatus 206 remains coupled to the body-in-white 106 or the carrier 114 for a predetermined delay period. In one example, the predetermined delay period is about 15 seconds to about a minute. By having the auxiliary vibration apparatus 206 remain coupled to the body-in-white 106 or the carrier 114 over the predetermined delay period, the vibrations output at the continuous or modulated frequency into the body-in-white 106 or the carrier 114 assists with the draining of the paint 102 from the body-in-white 106 after exiting the paint bath 112, and also reduces pooling of the paint 102 on the body-in-white 106. Thus, by remaining coupled to the body-in-white 106 or the carrier 114 during the predetermined delay period, the application of the paint 102 to the body-in-white 106 is improved. At the expiration of the predetermined delay period, the auxiliary vibration apparatus 206 is uncoupled from the body-in-white 106 or the carrier 114 at the exit 112.2 of the paint bath 112. It should be noted that in other examples, the auxiliary vibration apparatus 206 may be uncoupled from the body-in-white 106 or the carrier 114 upon the exit of the body-in-white 106 from the paint bath 112. In order to uncouple the auxiliary vibration apparatus 206 from the body-in-white 106 or the carrier 114, with the toggle lever 216 substantially horizontal to the mounting bracket 214, the toggle lever 216 is raised to extend substantially vertical to the mounting bracket 214 to unclamp the hook 212 so the hook 212 may be unhooked from the body-in-white 106 or the carrier 114. The power cable 236 is uncoupled from the arm 114.1 of the carrier 114. The method ends at 312. The auxiliary vibration apparatus 206 may be returned to proximate the entry 112.1 of the paint bath 112 for use with another vehicle 108.

Thus, the paint application system 200 improves the application of the paint 102 to the vehicle 108 in the paint submersion operation 100 by providing the auxiliary vibration apparatus 206, which is quickly and easily coupled to the body-in-white 106 or the carrier 114 upon entry and exit from the paint bath 112. In addition, the paint application system 200 does not require modifications to the conveyor system 110 or the paint bath 112 to improve the application of the paint 102 to the vehicle 108. The paint application system 200 also does not interfere with the electrostatic deposition of the paint 102, if employed. Further, the paint application system 200 is reusable, which reduces costs. It should be noted that while the paint application system 200 is discussed herein for introducing shear forces into the paint bath 112, a portion of the conveyor system 110 disposed in the paint bath 112 may also include an electric vibration motor alternatively or in addition to the auxiliary vibration apparatus 206 of the paint application system 200. In addition, while the paint application system 200 is described herein as outputting vibrations continuously or at the modulated frequency from the entry 112.1, through the main paint passage 112.3 and to the exit 112.2 of the paint bath 112 such that the body-in-white 106 is subject to sympathetic vibrations continuously throughout the travel of the body-in-white 106 through the paint bath 112, in other examples, the auxiliary vibration apparatus 206 may be controlled to introduce sympathetic vibrations at discrete locations within the paint bath 112 as the body-in-white 106 traverses the paint bath 112 from the entry 112.1 to the exit 112.2.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A paint submersion system, comprising:
    a bath having an entry, an exit opposite the entry, and a passage defined between the entry and the exit configured to be filled with a paint at a depth to submerge a body-in-white associated with a vehicle;
    a conveyor system configured to transport the body-in-white through the bath from the entry to the exit, the conveyor system including a carrier configured to receive the body-in-white; and
    a paint application system to be coupled to the body-in-white proximate the entry of the bath, the paint application system including at least one clamp configured to be coupled to the body-in-white, an electric vibration motor coupled to the at least one clamp, a variable frequency drive in communication with the electric vibration motor and a controller in communication with the variable frequency drive, the electric vibration motor is configured to introduce sympathetic vibrations into the body-in-white as the body-in-white is transported through the bath and the controller is configured to control the variable frequency drive to supply power to the electric vibration motor at a modulated frequency to inhibit a standing wave vibration of the body-in-white.

2. The paint submersion system of claim 1, wherein the modulated frequency varies between a rated frequency of the electric vibration motor and up to 10% less of the rated frequency of the electric vibration motor in a sinusoidal pattern over a predetermined period of time.

3. The paint submersion system of claim 1, further comprising a bracket having a first surface coupled to the at least one clamp and an opposite second surface coupled to the electric vibration motor, the bracket to couple the electric vibration motor to the at least one clamp.

4. The paint submersion system of claim 1, wherein the at least one clamp is configured to be coupled to a floorboard of the body-in-white of the vehicle to introduce the sympathetic vibrations into the body-in-white.

5. The paint submersion system of claim 1, wherein the at least one clamp is a horizontal J-hook toggle latch clamp and the electric vibration motor is overmolded with a waterproofing material.

6. A method for paint application for a vehicle in a paint submersion system, comprising:
    providing a bath having an entry, an exit opposite the entry, and a passage defined between the entry and the exit configured to be filled with a paint at a depth to submerge a body-in-white associated with the vehicle, a conveyor system configured to transport the body-in-white through the bath from the entry to the exit, the conveyor system including a carrier configured to receive the body-in-white, and a paint application system to be coupled to the body-in-white proximate the entry of the bath, the paint application system including at least one clamp configured to be coupled to the body-in-white, an electric vibration motor coupled to the at least one clamp, a variable frequency drive in communication with the electric vibration motor and a controller in communication with the variable frequency drive;
    coupling the electric vibration motor to the body-in-white with at least one clamp; and
    controlling the variable frequency drive to supply power to the electric vibration motor at a modulated frequency and the electric vibration motor is configured to introduce sympathetic vibrations into the body-in-white as the body-in-white is transported through the bath.

7. The method of claim 6, wherein the controlling, by the processor, the electric vibration motor at the modulated frequency further comprises:
    varying a frequency between a rated frequency of the electric vibration motor and up to 10% less of the rated frequency of the electric vibration motor in a sinusoidal pattern over a predetermined period of time.

8. A paint submersion system, comprising:
    a bath having an entry, an exit opposite the entry, and a passage defined between the entry and the exit configured to be filled with a paint at a depth to submerge a body-in-white associated with a vehicle;
    a conveyor system configured to transport the body-in-white through the bath from the entry to the exit, the conveyor system including a carrier having a floor panel configured to receive the body-in-white;
    a paint application system to be coupled to the body-in-white or the carrier proximate the entry of the bath, the paint application system including:
        at least one clamp configured to couple the paint application system to the body-in-white or the carrier;
        a mounting bracket having a first surface opposite a second surface, the first surface coupled to the at least one clamp;
        an electric vibration motor coupled to the second surface of the mounting bracket, the electric vibration motor configured to introduce sympathetic vibrations into the body-in-white as the body-in-white is transported through the bath;
    a variable frequency drive in communication with the electric vibration motor; and a controller in communication with the variable frequency drive, the controller configured to control the variable frequency drive to supply power to the electric vibration motor at a modulated frequency, and the modulated frequency varies between a rated frequency of the electric vibration motor and up to 10% less of the rated frequency of the electric vibration motor in a sinusoidal pattern over a predetermined period of time.

9. The paint submersion system of claim 8, wherein the at least one clamp is configured to be coupled to a floorboard of the body-in-white of the vehicle.

10. The paint submersion system of claim 8, wherein the carrier has a carrier arm, and the at least one clamp is configured to be coupled to the carrier arm.

11. The paint submersion system of claim 8, wherein the at least one clamp is a horizontal J-hook toggle latch clamp and the electric vibration motor is overmolded with a waterproofing material.

\* \* \* \* \*